United States Patent [19]

Suzuki et al.

[11] Patent Number: 4,578,729
[45] Date of Patent: Mar. 25, 1986

[54] MAGNETIC RECORDING MEDIUM

[75] Inventors: Takashi Suzuki, Osaka; Hiroshi Fujimori, Nara; Masaru Odagiri, Hyogo, all of Japan

[73] Assignee: Matsushita Electric Industrial Co., Ltd., Osaka, Japan

[21] Appl. No.: 434,600

[22] Filed: Oct. 15, 1982

[30] Foreign Application Priority Data

Oct. 15, 1981 [JP] Japan .................................. 56-16519
Dec. 9, 1981 [JP] Japan ................................ 56-199282

[51] Int. Cl.$^4$ .............................................. G11B 5/70
[52] U.S. Cl. .................................... 360/134; 427/128; 427/132; 428/172; 428/323; 428/694; 428/900
[58] Field of Search ....................... 360/134, 135, 136; 428/694, 900, 323, 143, 161, 172, 457, 480, 152; 427/128, 131, 132

[56] References Cited

U.S. PATENT DOCUMENTS

| 4,153,920 | 5/1979 | Shirahata et al. | 360/131 |
| 4,233,352 | 11/1980 | Ono et al. | 428/480 |
| 4,420,531 | 12/1983 | Tokuda | 360/134 |

FOREIGN PATENT DOCUMENTS

| 0116115 | 10/1978 | Japan . | |
| 0128683 | 11/1978 | Japan . | |
| 0043703 | 5/1979 | Japan | 360/134 |
| 0094574 | 7/1979 | Japan . | |
| 0010455 | 2/1981 | Japan . | |
| 0016937 | 2/1981 | Japan . | |
| 0101650 | 9/1981 | Japan | 360/134 |

Primary Examiner—Stuart N. Hecker
Assistant Examiner—David J. Severin
Attorney, Agent, or Firm—Burgess, Ryan & Wayne

[57] ABSTRACT

A magentic recording medium in which a thin ferromagnetic film is formed over a strip or sheet of plastic film whose surface is formed with grain-, rumple- or worm-like nodules into which may be dispersed finely divided particles of the diameter ranging from 0.01 to 0.2 μm. In the case of a thin ferromagnetic metal film type recording medium, steep protrusions of the height ranging from 100 to 2,000 Å are distributed over the surface at the average density of $10^4$ to $10^6$ per mm$^2$.

4 Claims, 8 Drawing Figures

MAGNETIC RECORDING MEDIUM

BACKGROUND OF THE INVENTION

The present invention relates to a magnetic recording medium especially adapted for use with a rotary head type video tape recorder.

In the fabrication of thin ferromagnetic film type recording media, an vacuum evaporation, sputtering or ion-plating process is employed so that iron, cobalt, nickel or their alloy may be deposited over a base of a high-weight compound film such as polyester or polyimide film. Such thin ferromagnetic film type magnetic recording media are by far advantageous over the prior art coating type magnetic recording media consisting of a base and a thin magnetic layer in that the recording density can be remarkably increased. However, in order to attain a higher degree of recording density, the surfaces of a magnetic recording medium must be made as flat as possible so that "spacing loss" may be reduced to a minimum. But if the surface is extremely smooth or flattened, it makes intimate contact with a magnetic head so that the smooth transportation of the magnetic tape past the head is hindered. With the rotary head type video tape recorder system which has been increasingly popular in the market, the use of thin ferromagnetic film type magnetic recording media is almost imperative in order to improve the recording denisty. Such magnetic recording media or tapes must satisfy various demands in practice. For instance, they must make a suitable contact with rotary heads so as to avoid excessive wear or abrasion of the heads, thereby preventing the clogging of gaps thereof. Furthermore, even when they are in contact with a rotary head cylinder, tape guide posts, a stationary audio head and so on, they must move past them smoothly. In other words, they must have a low coefficient of friction and exhibit a high degree of resistance against wear. The magnetic layer of a thin ferromagnetic film type magnetic recording tape is extremely thin and is of the order of from 0.1 to 0.5 $\mu$m so that the above-described properties or characteristics are all dependent upon the surfaces of the plastic film which is the base of the magnetic recording medium. Therefore, various proposals have been made in order to provide satisfactory surface textures of the bases. For instance, such proposals were disclosed in Japanese Laid Open Patent Application Nos. 116115/1978, 128683/1978, 94574/1979, 10455/1981 and 16937/1981. These proposals are common in that they impart to the surface relatively uniform and minute roughness. For instance, the surface is formed with rumple- or worm-like nodules or with grain-like nodules. The common object of such proposals is, therefore, to maintain suitable contact with the magnetic heads, thereby improving the transportability; that is, the smooth travel of the magnetic tape past the heads and the like. In the case of the rotary head assembly of a video tape recorder, the width of contact between a magnetic tape and a head is extremely narrow and is of the order of less than hundreds of microns. Furthermore, the relative velocity between the magnetic tape and the head is extremely high and is of the order of a few meters per second, whereas in the tape transport system, the magnetic tape is transported at a relatively slow velocity of the order of a few centimeters per second and makes contact with various component parts in the transport system with relatively large areas. Therefore, the surface texture design becomes a compromise between the ability of tape to move smoothly past the rotary head assembly and its associated parts and the ability of being smoothly transported through the tape transport system. In addition, the surface texture must be so designed as to have some abrasive action on the rotary heads in order to prevent clogging of the gaps thereof.

SUMMARY OF THE INVENTION

In view of the above, the primary object of the present invention is to provide a thin ferromagnetic film type magnetic recording medium which exhibits a higher degree of resistance against wear when in contact with rotary magnetic heads, ensures a higher degree of transportability, prevents clogging of the gaps of the rotary magnetic heads and ensures steady recording and reproducing of signals.

To the above and other ends, the present invention provides a magnetic recording medium in which a thin ferromagnetic film is formed over the surface of a plastic film base which is formed with grain-, rumple- or worm-like nodules into which are locally dispersed finely divided particles of the diameter of 0.01 to 0.2 $\mu$m. Furthermore, the present invention provides a thin ferromagnetic metal thin film type magnetic recording medium with the surfaces from which are extended steep protrusions of the height ranging from 100 to 2,000 Å at an average density of $10^4$ to $10^6$ per mm$^2$. As described above, since the surface of the magnetic recording medium is distributed with steep protrusions or formed with grain-, rumple- or worm-like nodules into which are locally dispersed finely divided particles, the magnetic recording medium in accordance with the present invention can simultaneously satisfy not only the requirement for smooth transportability but also capability of preventing the clogging of the gaps of the rotary magnetic heads.

DETAILED DESCRIPTION OF THE INVENTION

Figure 1:
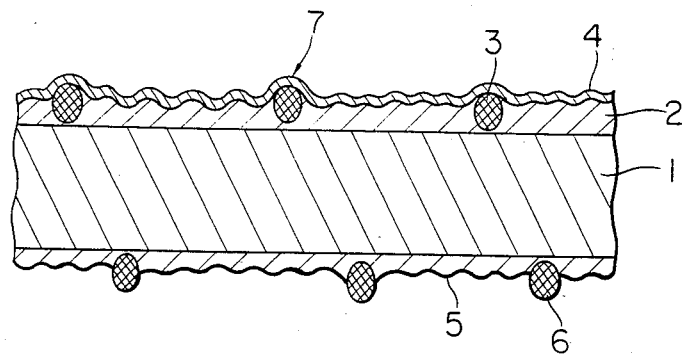
FIGS. 1, 2, 4, 5 and 6 are longitudinal sectional views, respectively, of magnetic recording media in accordance with the present invention.

First, magnetic recording media formed with the surfaces in which finely divided particles are locally dispersed or which have grain-, rumple- or worm-like nodules will be described.

Finely divided particles whose diameter ranges from 0.01 to 0.2 $\mu$m are generally known as "colloidal particles". For instance, they are metal oxides such as $Al_2O_3$, $SiO_2$, $MgO$, $TiO_2$, $ZnO$, $Fe_2O_3$, $CdO$, $NiO$, $CaWO_4$ or $BaTiO_3$; carbonates such as $CaCO_3$, $BaCO_3$ or $CoCO_3$; metallic finely divided particles of Au, Ag, Cu, Ni and Fe; and protective colloids whose nuclei consist of the abovementioned finely divided particles or plastic particles. These finely divided particles can be obtained by the reaction of suitable compounds with acids or alkali, the hydrolysis of organic metal compounds and halides, the hydrothermal synthesis, the hydrolysis, the reduction of salt solutions, the evaporation in gases or the orientation or absorption of high-molecular compounds. Of these finely divided particles used in the present invention are those which are 0.01 to 0.2 μm in average diameter and are dispersed in grain-, rumple- or worm-like nodules in a coating. More specifically, according to the present invention gold (Au) particles 0.005 μm in diameter can be used as nuclei and are grown to the finely divided particles 0.01 μm in diameter when locally dispersed.

For instance, polyester film, which is one of the plastic films, may be formed with wrinkle- or rumple-like nodules on its surfaces in the following manner. Firstly, a linear saturated polyester such as polyethylenetelephthalate, polybutylenetelephthalate or polyoxyethylene-p-oxybenzoate is dissolved into a solvent such as a mixture of dichloroacetc acid and orthochlorophenolethane tetrachloride. Thus, the prepared solution is thinly applied over the surfaces of a polyester film and then dried. In this case, a polyester base which is adapted to be used in the present invention can be obtained by adding a predetermined amount of the above-mentioned finely divided particles in the solution. An alternative method is such that during the step of elongating a polyester film, a resin or plastic solution whose major constituent is an aqueous emulsion of silicone plastics is applied to the surfaces of the film. After the plastic solution thus applied has been dried and cured, the elongation of the film is continued so that its surfaces are imparted with grain- or worm-like nodules. In this case, the polyester films which are adapted to be used in the present invention can be also obtained by adding a predetermined quantity of the abovementioned finely divided particles. It is preferable to add 0.1 to 50% by weight of finely divided particles per each 100% by weight of plastic solids in the solution and it is more preferable that the range of finely divided particles be between 0.5 and 10% by weight. If the content of the finely divided particles is less than 0.1% by weight, the transportability of the magnetic recording media cannot be improved at a high degree of humidity and if the content is higher than 50% by weight, the increase in noise as well as the decrease in output will result.

Figure 2:
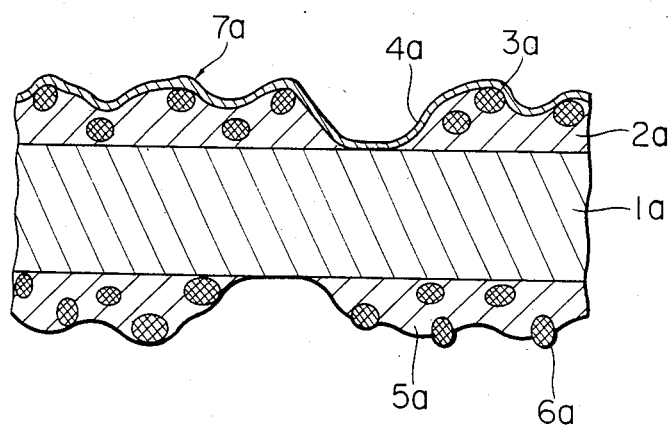

FIGS. 1 and 2 show in cross section in the direction of thickness two preferred embodiments of the present invention, respectively. In both figures, reference numerals 1 and 1a denote a film base; 2 and 2a and 5 and 5a, rumple- and worm-like nodules formed over the surfaces of the film bases 1 and 1a, respectively; 3 and 3a, finely divided particles dispersed in the rumple- and worm-like nodules 2 and 2a; 4 and 4a, thin ferromagnetic films or coatings formed over the surfaces of the film bases 1 and 1a; and 6 and 6a, finely divided particles dispersed in the rumple- and worm-like nodules 5 and 5a. In the first embodiment as shown in FIG. 1, the thickness of the rumple-like nodule layer 2 is equal to or less than the diameters of dispersed finely divided particles 3, where in the second embodiment as shown in FIG. 2, the thickness of the worm-like nodule layer 2a is greater than the diameters of dispersed finely divided particles 3a. Both the first and second embodiments have a common feature that some finely divided particles 6 and 6a protrude out of the rumple- and worm-like nodule layers 2 and 2a as indicated by 7 and 7a. The first and second embodiments have been shown and described as having the rumple- and worm-like nodules layers formed over both the upper and lower surfaces, but it is to be understood that the rumple- and worm-like nodule layers 2 and 2a need not to be formed over the rear or lower surfaces of the bases 1 and 1a. Instead, the lower or rear surface of the film base 1 or 1a may be formed with a coating of a high-molecular compound containing a suitable lubricant. Alternatively, the undersurfaces may be formed with a conventional back coating.

In order to define the surface texture of the magnetic recording media in accordance with the present invention, the height of a protrusion is expressed in terms of $R_{max}$; that is, the maximum height as measured according to JIS B0601, and more particularly the distance between the peak and the valley. To this end, a high precision surface roughness value measuring instrument (TALYSTEP-1, the product of Taylor-Hobson Co.) was used. In addition, in order to count the grain-, rumple- or worm-like nodules per unit area and the number of protrusions due to dispersed finely divided particles 6 or 6a per unit area, a scanning electron microscope or a differential interference optical microscope (XP-NR type OPTIPHOT, the product of Nippon Kogaku Kogyo KK.) was used. The magnification was between ×50 and ×10,000 and at least ten spots or fields per specimen were observed. The number of protrusions observed in each field was counted and converted into an average number per $mm^2$.

According to the present invention, it is preferable that the height of the grain-, rumple- or worm-like nodules be between 50 and 300 Å and that they be spaced apart from each other by 0.1 to 10 μm. If the height is less than 50 Å, desired effects cannot be attained; wear of a rotary head is accelerated; and a still-picture-display life expectancy is reduced. On the other hand, if the height is in excess of 300 Å, the output drops. If the space between the grain-, rumple- or worm-like nodules exceeds 10 μm, noise is generated. With the magnetic recording medium with the above-described surface texture or surface roughness tolerances, a high degree of transportability through a video tape recorder at a high humidity can be ensured, but if the humidity exceeds 80% R.H. (Relative Humidity), the magnetic tape tends to be decelerated or to slip around the stationary cylinder of a rotary head and/or tape guide posts, so that jitter or the like results. In the worst case, the magnetic tape cannot pass past these members. To overcome such problem, the present invention not only imparts the surface of the base with the grain-, rumple- or worm-like nodules but also provides small protrusions of finely divided particles in these nodules as described above. It is preferable that the height of the minute protrusions be in excess of 50 Å and more preferably in excess of 100 Å over the tops of worm-like nodules. In addition, it is preferable that the density be higher than 100 protrusions per $mm^2$ or more preferably higher than 10,000.

Next, will be described a further embodiment in which the surface of a magnetic recording medium is formed with steep ridge-like protrusions with reference to the accompanying drawings.

Figure 3:
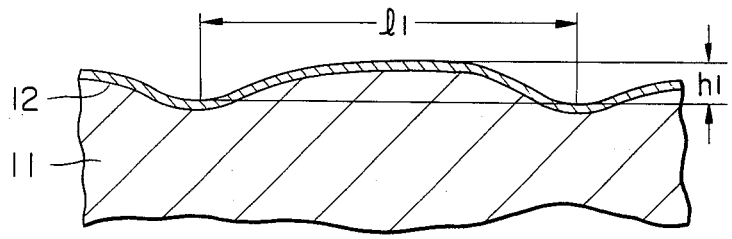
FIG. 3 is a longitudinal sectional view of a prior art magnetic recording medium.
Figure 4:
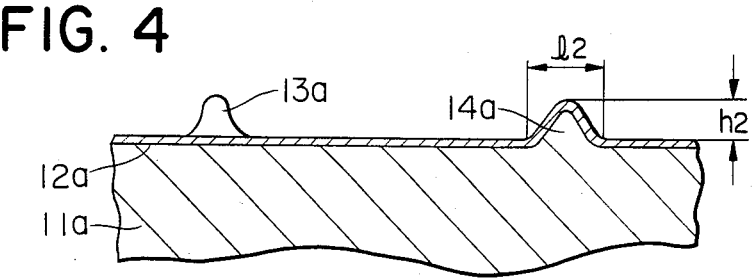
Figure 5:
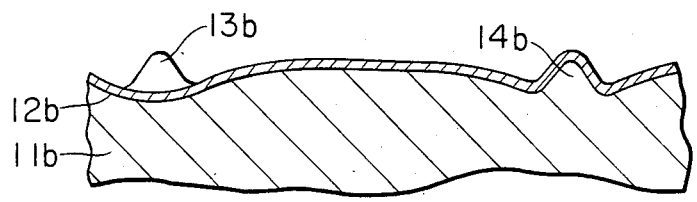
Figure 6:
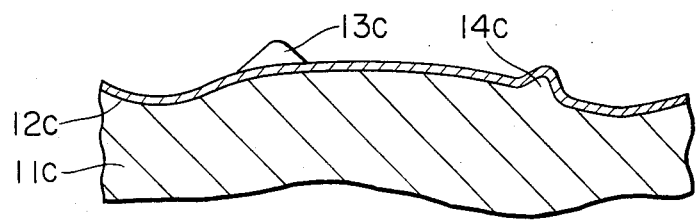

FIG. 3 shows a cross sectional view of a conventional magnetic recording medium provided with protrusions with relatively gentle slopes and FIGS. 4, 5 and 6 show in cross section preferred embodiments of the present invention. In these figures, reference numerals 11, 11a, 11b and 11c designate bases made of film or the like; 12, 12a, 12b and 12c, thin ferromagnetic coatings; 13a, 13b and 13c, ridge-like protrusions extended from the thin ferromagnetic coatings with a relatively sharp slope; and 14a, 14b and 14c, steep ridges or protrusions extended from the bases 11a, 11b and 11c. In FIGS. 3 to 5, $l_1$ and $l_2$ indicate the length of the base of the protrusions in the longitudinal direction of the recording medium and $h_1$ and $h_2$, the heights thereof. In the conventional magnetic recording media, as shown in FIG. 3, the ratio $l_1:h_1$ of a rumple-, worm- or grain-like nodule is at least 10:1 in the longitudinal direction of the recording medium and in general 50 to 100:1. However, in the case of the third embodiment of the present invention as shown in FIG. 4, the ratio $l_2:h_2$ is less than 10:1 and more preferably less than 5:1 so that the protrusions have a relatively steep slope, which is one of the features of the present invention. According to the experiments conducted by the inventors it was confirmed that if the density of such steep protrusions is $10^4$ to $10^6$ mm$^2$ on the average, clogging of the gap of a rotary head or the like can be effectively avoided. It is preferable that the height of such protrusions be between 100 and 2,000 Å and more preferably between 150 and 500 Å. It was also found out that if the height be in excess of 2,000 Å the "spacing loss" will be enhanced, whereas if the height is less than 100 Å, the effective prevention of clogging the gap of the head cannot be ensured. The height as well as the density of steep protrusions were obtained in a manner substantially similar to that described hereinbefore in conjunction with FIGS. 1 and 2.

In the third embodiment as shown in FIG. 4, the steep protrusions 13a are extended upwards from the flat surface. However, it is preferable that as shown in FIG. 5 the top or upper surface of the recording medium has rumple- or worm-like wave nodules or grain-like nodules and that the steep protrusions are extended from recesses or valleys with a relatively gentle slope. Alternatively, the steep protrusions may be extended from some portions of the rumple- or worm-like nodules or grain-like nodules with a relatively gentle gradient or slope. In other words, the positions of steep protrusions or the like are not limited to the gentle slope valleys or recesses opposed to the arrangement as shown in FIG. 5. In the case of the embodiment as shown in FIG. 5 or 6, the height of steep protrusions is at least 50 Å higher than the height of the waviness; that is, the gently curved surface of the base, and more preferably the steep protrusions extend higher than 100 Å from the curved surface. Advantageous effects can be attained especially when the gently sloped waves are spaced apart from each other by 0.1 to 10 μm. It should be noted that the steep protrusions may be extended either from the base 11b or 11c or from the thin magnetic coating 12b or 12c.

A magnetic recording medium in accordance with the present invention can be fabricated in a manner as described below. First, a strip of polyester film with uniformly flat surfaces or with wrinkled surfaces is prepared as a base and after or simultaneous with the precipitation over the surface of the base minute crystals of oligomer; that is, low polymerized polyester contained in the polyester film a thin ferromagnetic coating is formed over the surface of the base in a vacuum. In this case, precipitated oligomer crystals constitute steep protrusions. An alternative process is as follows. A thin wrinkled, crystalline high-molecular film containing extremely finely divided particles such as carbon black, finely divided silica or metal powder is coated over the surface of a strip of uniformly flat polyester film base. A further process is such that while a strip of polyester film with uniformly flat surfaces is being fabricated, a bridged high-molecular compound film or coating containing the above-described extremely finely divided particles is simultaneously formed. As a result, worm- or grain-like nodules are formed in which the extremely finely divided particles are dispersed. Thereafter, a thin ferromagnetic film or coating is formed.

Yet another process is such that a thin ferromagnetic film or coating is formed over the uniformly flat or wrinkled, rumple- or grain-like recessed surfaces of a strip of polyester film. Thereafter, a dilute solution consisting of a binder and extremely finely divided particles such as carbon black, finely divided silica or metal powder is coated and dried. In addition to polyester film, used as a base are high-molecular compound films such as polyimide or polyimide film and metal foils such as stainless steel, titanium and the like.

In order to form a thin ferromagnetic film or coating over the film base whose surface texture has been suitably controlled, a vacuum evaporation, ion-plating or sputtering process may be employed so that iron, cobalt, nickel or an alloy thereof is directly deposited over the film base or over an intermediate coating or undercoating of aluminum, titanium or chromium formed over the base. Such thin nonmagnetic film may be interposed between thin ferromagnetic films as a separator. In these cases, when the thin ferromagnetic film and the undercoating contain oxygen; that is, when metals are partially oxidized, the adhesion or bonding strength of the thin ferromagnetic film to the base film can be enhanced. As a result, the still-picture-display life expectancy can be increased. If necessary, an overcoating consisting of various nonmagnetic compounds may be applied over the thin ferromagnetic film. As described hereinbefore, the steep protrusions can be extended from such overcoating. Furthermore, in order to ensure the smooth transportability of the recording tape, the rear surface thereof may be suitably processed by any conventional methods.

Next, some examples of the present invention will be described below.

EXAMPLE 1

An aqueous emulsion containing the following emulsions was prepared:
(A) Epoxy polydimethylsiloxene emulsion,
(B) Magnesium chloride emulsion, and
(C) Methylcellulose This aqueous emulsion was mixed with the following colloidal solutions:
(A) Colloidal solution of calcium carbonate (the reaction product between milk of lime and $CO_2$ at high temperature),
(B) Colloidal solution of titanium oxide (the product of hydrolysis of alkoxide), and
(C) Colloidal solution of iron oxide hydrate (obtained by adding alkali to a ferrous salt solution).

Figure 7:
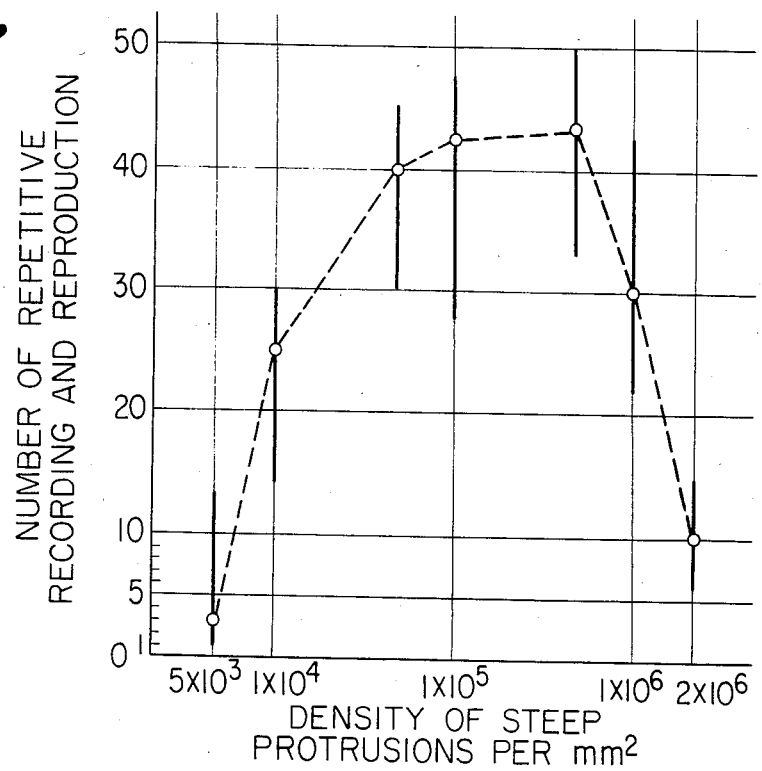
FIGS. 7 and 8 are graphs used for explaining the relation between the density of steep protrusions extended from the surface of a magnetic recording medium and clogging of the gap of a magnetic head.

This aqueous emulsion was applied to both surfaces of strips of uniaxially elongated polyethyleneterphthalate film and dried. Thereafter, the strips of film were further elongated transversely or in cross direction and thermally cured, whereby polyester film 12 μm in thickness was obtained. Both surfaces of this film were formed with worm-like nodules from which were locally extended or protruded finely divided particles. These film strips were spliced and rolled. The roll was then placed in an oblique vacuum evaporation equipment which contained a small amount of oxygen and a Co—Ni alloy containing 20% by weight of Ni was obliquely deposited over one major surface of the film, thereby forming a thin ferromagnetic film 0.1 μm in thickness. Thereafter, the other major surface of the film strip was coated with thin epoxy resin lubricant film containing some graphite. Next, the film strip was slit into nine tapes of a predetermined width, each having different magnetic surface textures. The specifications of such nine samples are listed in TABLE below.

types of magnetic tapes were prepared. The precipitation of minute crystals of oligomer formed steep protrusions whose average height was between 300 and 500 Å. These tapes were left at 60° C. and 90% R.H. for one month so that rust which would cause the clogging of the gap of a magnetic head was produced. At 20° C. and 60% R.H., video recording and reproduction were repetitively made in order to determine the number of repetition at which the clogging of the gap of the magnetic head causes the degradation in picture quality. The results are shown in FIG. 7.

TABLE 2

| | Surface Textures resulting from the treatment of aqueous emulsion | | | | | | |
|---|---|---|---|---|---|---|---|
| Sample No. | worm-like modules, height in Å | worm-like nodules, spacing in μm | particle size in μm | particle protrusion density, the number of protrusions per mm² | nuclei of particles | still-picture-display lifetime in minute | degradation in picture quality at high humidity |
| 1 | 50 | 0.2 | 0.005 | 10,000 | calcium carbonate | 150 | observed |
| 2 | " | " | 0.01 | " | calcium carbonate | 190 | not observed |
| 3 | 120 | 1.0 | 0.05 | 1,000 | calcium carbonate | 210 | not observed |
| 4 | " | " | " | 5,000 | calcium carbonate | 220 | not observed |
| 5 | 220 | 1.5 | 0.1 | 1,000 | calcium carbonate | " | not observed |
| 6 | " | " | 0.05 | 10,000 | titanium oxide | 250 | not observed |
| 7 | " | " | 0.1 | 2,000 | titanium oxide | 240 | not observed |
| 8 | 150 | 1.0 | " | 500 | iron oxide hydrate | 200 | not observed |
| 9 | " | " | 0.3 | " | iron oxide hydrate | 210 | noise is high from the start |

The sample tapes were housed in cassettes and were subjected to the image quality tests as well as the still-picture-display life expectancy tests with a home video tape recorder at 25° C. and at 65% R.H. (relative humidity) and at 25° C. and 85% R.H. One of the objects of the tests was to investigate the degradation in image or picture quality due to jitter or the like at relatively high humidity. The test results are also listed in the above TABLE. It should be noted that Sample 1 is not of the present invention and was tested for the sake of comparison with other samples of the present invention.

From TABLE it is apparent that the magnetic recording media in accordance with the present invention have a long still-picture-display lifetime and are free from the degradation in picture quality at relatively high humidity.

EXAMPLE 2

Polyester film was used which was entirely free from minute particles which were the residue of polymerization catalysts. When this film was being elongated, a modified silicone emulsion containing a thickener was applied to both major surfaces of the film and then cured. As a result, the surfaces were corrugated or wrinkled and the spacing between the ridges was about 1 μm. The surface roughness value was 200 Å. By varying the temperature (between 180° and 200° C.) hot air and the continuous blowing time interval, minute crystals of polyester oligomer were precipitated over the surfaces at various densities. Thereafter, by employing an oblique vacuum evaporation process, a thin Co—Ni(Ni=20% by weight) film of the thickness of 1,000 Å was deposited over one major surface of the film in the presence of a small amount of oxygen. Thus, various

EXAMPLE 3

Figure 8:
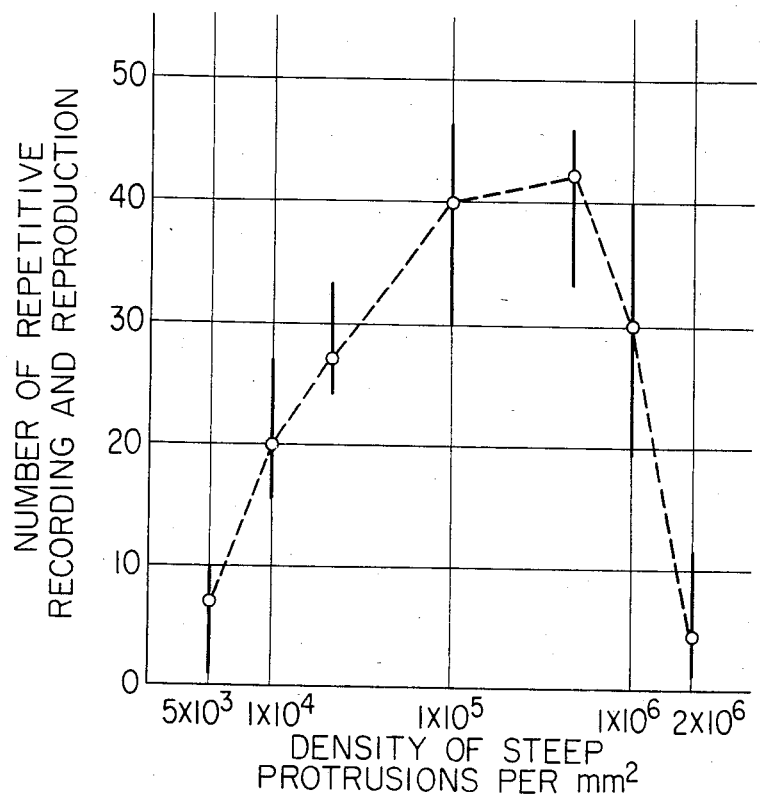

Polyester film was used which was almost free from particles which were the residue of the polymerization catalysts. A solution containing 1% by weight of the stoichiometric mixture of phenol and ethane tetrachloride was prepared and applied to the both the surface of the film and dried by blowing hot air. The surfaces were imparted with rumple-like ridge nodules (spaced apart from each other by 2.5 μm) with the surface roughness value of 300 Å. Thereafter, following the procedure of EXAMPLE 2, a thin Co—Ni film was formed and an aqueous emulsion of epoxy modified silicone containing colloids of titanium oxide (the product of hydrolysis of titanium alkoxide) which varied in concentration was applied to the thin ferromagnetic film and baked. As a result, several magnetic tapes were prepared whose magnetic coating was formed with steep protrusions whose nuclei were titanium colloidal particles. The average height of the steep protrusions was 400 Å. Following the procedure of EXAMPLE 2, the relationship between the protrusion density and the reproduction circuit was obtained and the results are shown in FIG. 8.

In summary, according to the present invention, the magnetic recording media can be advantageously used as video recording magnetic tapes which can satisfactorily withstand wear and abrasion by the magnetic head and ensure a higher degree of transportability. In addition, they can effectively avoid the clogging of the gap of the magnetic head.

What is claimed is:

1. A magnetic recording medium comprising a thin ferromagnetic metal film formed as a magnetic layer; and strip protrusions having a height between 100 and 2,000 Å distributed over the surface of said magnetic layer at an average density ranging from $10^4$ to $10^6$ protrusions per mm$^2$, and the ratio between the length and the height of said protrusions is less than 10:1.

2. A magnetic recording medium as set forth in claim 1, wherein said ratio is less than 5:1.

3. A recording medium as set forth in claim 1, wherein said surface of said magnetic layer is formed with gently sloping grain-rumple- or worm-like nodules having a height less than that of said protrusions and which are spaced apart from each other by a distance ranging between 0.1 and 10 μm.

4. A magnetic recording medium as set forth in claim 3, wherein said protrusions have a height at least 50 Å higher than the height of said nodules.

* * * * *